United States Patent [19] [11] 3,765,155
Courbon [45] *Oct. 16, 1973

[54] APPARATUS FOR THE SUCTION AND PURIFICATION OF POLLUTED AIR

[75] Inventor: Paul Courbon, Verneuil-en-Halatte, France

[73] Assignee: Charbonnages De France, Paris, France

[*] Notice: The portion of the term of this patent subsequent to July 6, 1988, has been disclaimed

[22] Filed: Apr. 6, 1970

[21] Appl. No.: 25,690

[30] Foreign Application Priority Data

Apr. 4, 1969 France .............................. 6910595
Mar. 5, 1970 France .............................. 7007988

[52] U.S. Cl. ................. 55/270, 55/274, 55/307, 55/317, 55/337, 55/338, 55/357, 55/400, 55/429, 55/459, 55/467, 55/486, 73/28
[51] Int. Cl. ........................................... B01d 53/30
[58] Field of Search .................. 55/270, 274–275, 55/307, 317, 337, 400–409, 429, 467–468, 470–473, 477, 338, 357, 459, 486; 73/28

[56] References Cited
UNITED STATES PATENTS

| 2,698,745 | 1/1955 | Boucher | 55/400 X |
| 2,230,453 | 2/1941 | Fitch | 55/337 X |
| 1,333,325 | 3/1920 | McGee | 55/347 X |
| 2,262,860 | 11/1941 | Roe | 55/349 |
| 3,399,516 | 9/1968 | Hough et al. | 55/487 |
| 3,171,726 | 3/1965 | Roney et al. | 55/275 |
| 3,017,239 | 1/1962 | Rodman | 21/58 |
| 3,128,940 | 4/1964 | McDonald | 55/400 X |
| 2,247,472 | 7/1941 | Bible | 55/337 X |
| 3,507,622 | 4/1970 | Tammelin | 73/23 X |
| 1,405,399 | 2/1922 | Donaldson | 55/418 X |
| 3,032,954 | 5/1962 | Racklyeft | 55/400 X |
| 3,234,716 | 2/1966 | Sevin et al. | 55/317 |
| 3,126,263 | 3/1964 | Schwab | 55/317 |
| 3,123,286 | 3/1964 | Abbott | 55/400 X |
| 2,294,183 | 8/1942 | Holm-Hansen | 55/307 |

FOREIGN PATENTS OR APPLICATIONS

| 1,037,365 | 7/1966 | Great Britain | 55/400 |
| 532,467 | 1/1941 | Great Britain | 55/400 |
| 762,433 | 11/1956 | Great Britain | 55/317 |

*Primary Examiner*—Frank W. Lutter
*Assistant Examiner*—Vincent Gifford
*Attorney*—Karl W. Flocks

[57] ABSTRACT

Apparatus for purification of polluted air comprising a radial fan, constituted by a thick filtering element made of permeable material and an impermeable supporting plate fixed together for rotation and rotating at a high and preferably constant speed in the interior of a closed sampling chamber provided with a suction orifice located on the filter side and with evacuation orifices situated on the supporting plate side, the sections of the suction orifice, the evacuation orifices and the sampling chamber having values such that the suction flow is less than the actual flow-rate of the radial fan.

15 Claims, 9 Drawing Figures

United States Patent
Courbon
[11] 3,765,155
[45] *Oct. 16, 1973
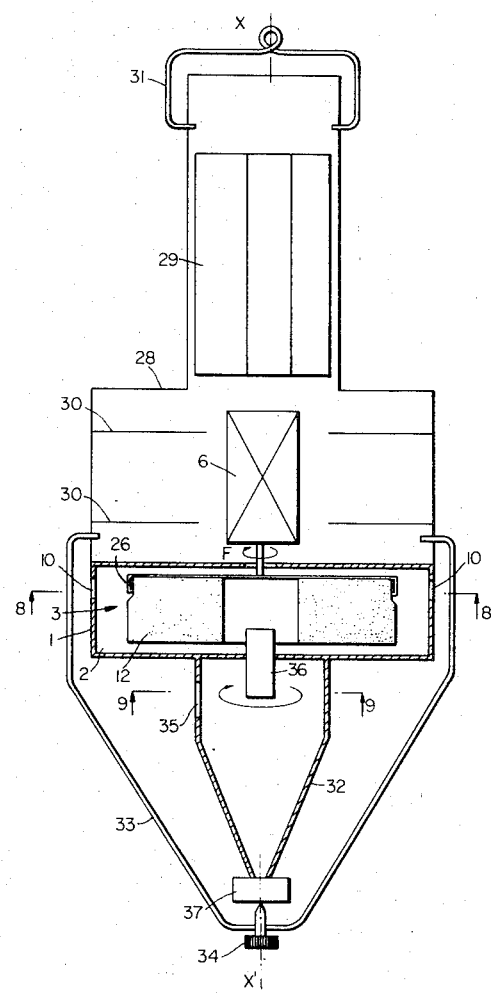

APPARATUS FOR THE SUCTION AND PURIFICATION OF POLLUTED AIR

In the fight against pollution of the atmosphere, whether due to the presence of noxious solid particles such as dust or whether due to the noxious nature of a pollutant itself, many devices are known which permit either the elimination of the polluting agent or the evaluation of its characteristics and its quantity. These devices are, in general, constituted by a suction device by means of which a fraction or the whole of the polluted air is caused to pass through the apparatus, and a purification device traversed by the indrawn polluted air and providing for the extraction or the otherwise elimination of the polluting agent.

Thus, there may be cited, for example, dust extractors and apparatus for eliminating carbon monoxide in the case of devices for totally freeing the atmosphere from the polluting agent, and apparatus for sampling dust or apparatus for the estimation of various gases with colored reagents, in the case of devices permitting the determination of the characteristics and the quantity of the polluting agent present.

However, specialists are becoming increasingly interested in smaller and smaller concentrations of the polluting agent. It follows that it is becoming more and more difficult to eliminate almost entirely the polluting agent from the air drawn-in to such devices.

In addition, in the case where the apparatus is to retain the polluting agent for the purpose of its measurement or examination, it becomes necessary to draw-in increasingly large volumes of polluted air during longer and longer periods, in order to collect a sample of polluting agent which is sufficient for its examination. These two conditions involve an increase in the complexity and of the power consumption of these devices and therefore an increase in their size, their weight and their cost.

Now, it is desirable that these devices may be distributed in large numbers in the polluted atmosphere, that they may be autonomous from the point of view of power supplied, light and of small overall size, that they may be of simple construction and easy to handle by non-specialist personnel.

It is known, furthermore, that a rotor constituted by a thick element made of permeable material and rotating on its own axis constitutes a radial fan which draws in air axially at its central zone and discharges it radially at its periphery, and which has a suction flow which is equal to the flow-rate of air passing through it radially. In addition to their characteristics of simplicity, these radial fans have the advantage of retaining in their mass at least the largest particles carried thereto in suspension in the indrawn air. However, the progressive blocking-up of the rotor causes a progressive reduction of the flow-rate of indrawn air, and in the case of high dust contents this reduction may be very rapid.

The present invention relates to an apparatus utilizing a rotor of the type referred to above, permitting a large volume of polluted air to be drawn-in over a long period, enabling the polluting agent to be collected in the actual mass of the rotor, and in which the suction flow is not substantially affected by the blocking-up of the rotor.

The apparatus according to the invention is characterized by the presence of a rotor comprising a radial fan, constituted by a thick filtering element made of permeable material and an impermeable supporting plate fixed together for rotation and rotating at a high and preferably constant speed in the interior of a closed sampling chamber provided with a suction orifice located on the filter side and with evacuation orifices situated on the supporting plate side, the sections of the suction orifice, the evacuation orifices and the sampling chamber having values such that the suction flow is less than the actual flow-rate of the radial fan.

In this apparatus, the thick filter forms a collection device capable of retaining solid particles carried thereto in suspension in the indrawn gaseous flow in such manner as either to free the indrawn gaseous flow practically entirely, or to collect a sample of the particles polluting the atmosphere, in which case the apparatus is adapted so as to effect the checks or the measurements of the proportion and of the nature of the dust content of the said atmosphere. In the first case, the apparatus acts as a remover of dust from the whole of the gaseous flow which passes through it, and in the second case it acts as an apparatus for sampling the dust in suspension in the polluted atmosphere under examination.

In this latter case, and for certain particular atmospheres, it is conventionally necessary to carry out a previous sorting of the dust which is to be retained by the filter or collecting member. Thus, when it is required to carry out checks or measurements of the pollution of works-site atmospheres such as the atmospheres in mining operations, it is current practice to admit to the collection member only the dust having a size less than a certain value, and/or in which the granulometry is distributed in accordance with a given distribution. The present invention thus also relates to an apparatus for sampling dust which provides a solution to this problem and eliminates the need for preliminary sorting.

This form of the apparatus is characterized in that:

The thick filter is held in a cup with a cylindrical edge and rotating about a vertical axis, having its opening directed downwards;

A cyclone separator comprising at least one tangential inlet is fixed in an air-tight and removable manner under the lower wall of the sampling chamber, and its transfer tube is directed upwards so as to form the suction orifice of the sampling chamber; and The peripheral evacuation orifices are disposed tangentially with respect to the cylindrical wall of the sampling chamber and in the direction of rotation of the thick rotor.

The invention will be better understood by referring to the description which follows below and with reference to the accompanying drawings, in which.

Figure 1:
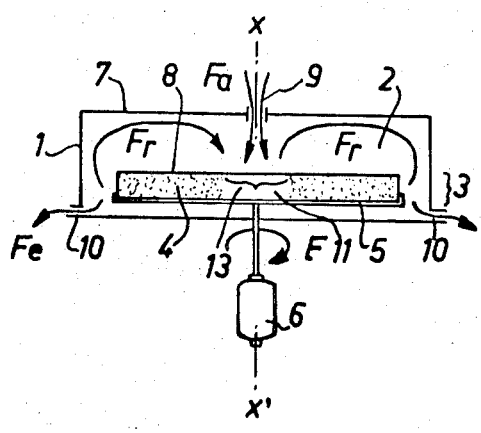
FIG. 1 shows in longitudinal section the basic diagram of an apparatus according to the invention more particularly intended for the collection of dust in suspension in a sample of dust-laden air passing through the apparatus.

In FIGS. 1 to 5 of the accompanying drawings, the reference 1 indicates a cylindrical casing having an axis X'-X defining a closed sampling chamber 2 containing the rotor 3 constituted by a thick filtering element 4 made of permeable material, such as polyurethane foam with open pores, fixed on a supporting plate 5 driven in rotation at high and preferably constant speed in the direction indicated by the arrow F, by any appropriate means, for example by the motor 6. The top 7 of the casing situated above and facing the top face 8 of the filtering element is provided with an axial suction orifice 9, while the lateral wall of the casing 1 is provided with a plurality of peripheral evacuation orifices 10 located adjacent the side of the plate 5.

Figure 2:
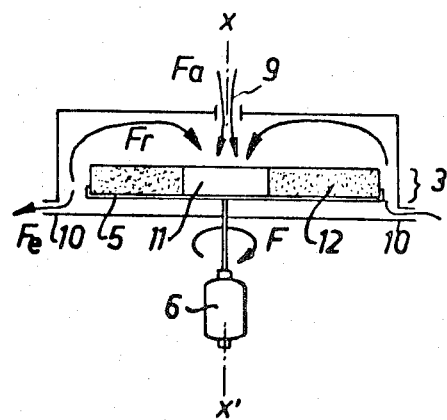
FIG. 2 is a view in longitudinal section of an alternative form of the apparatus according to the invention.

The filtering element 4 may have the form of a thick disc as shown in FIG. 1. It may also be hollowed out at its central portion 11 and may have, for example, the form of a thick ring 12 as shown in FIG. 2.

As is well known, rotation of the rotor 3 causes a radial displacement, in the actual mass of the filtering element 4, of the air present in that mass. This results in the creation of a dynamic condition which generates a pressure difference between the center of the chamber 2 and its periphery, the filtering element 4 (or 12) playing the part of a radial fan. This results in a suction of the outside air through the suction orifice 9 (arrows Fa) and a discharge of the air contained in the chamber 2 through the evacuation orifices 10 (arrows Fe).

According to the invention, the value of the diameter of the chamber 2 with respect to that of the external diameter of the rotor 3, and also the values of the sections of the orifices 9 and 10, are chosen in such manner that the suction and evacuation flow-rate of the apparatus is very much less than the actual flow-rate of the radial fan constituted by the filtering element 4. It follows that only a small portion of the air enclosed in the chamber 2 is delivered through the evacuation orifices 10 and renewed by the air drawn-in through the suction orifice 9, while the major part of the air enclosed in the chamber 2 is re-cycled into the interior of this chamber following the re-circulation movements indicated by the arrows Fr.

With a casing made of transparent material, it has been found that since the depression created by the rotation of the rotating system is greater at the center of the chamber 2, the streams of re-cycled air become uniformly distributed about the axis X'-X and converge towards the central zone 13 of the face 8 of the filtering element. In this movement, they force the streams of indrawn air Fa to come together around the axis X'-X.

The whole of the re-cycled and drawn-in air passes into the central zone 11 of the filtering element, and passes radially through the mass of this latter, the dust in suspension in the indrawn air being retained in the actual mass of the filtering element; and, in the form of embodiment shown in FIG. 2, being collected, at least partly in the case of the largest particles, by impact against the plate 5.

As the sampling proceeds, the filtering element becomes progressively blocked-up and becomes less and less permeable. It follows that the flow of air passing radially through the filtering element becomes less but, contrary to that which takes place with known devices comprising a fixed filtering element, it is found that the progressive blocking-up of the filtering element has only a subsequent effect on the suction flow of the apparatus. This causes the power consumed to remain practically unchanged for a longer period and in practice there is no need to provide any regulation devices for the suction flow and for the measurement of the total volume of air sampled, which always involve an increase in the consumed power and an increase in the complexity of the apparatus.

Furthermore, the fact that the suction and filtration are carried out by the same element eliminates the pressure losses due to possible leakage and to friction existing between the filtration element and the fan (or the pumping unit) which are generally separate in known apparatus.

All these reasons contribute to increase autonomy for the same installed power and the same suction flow, or, for a given same autonomy and for the same suction flow, less installed power and in consequence less overall size and weight, or again for the same installed power and the same autonomy, a higher suction flow.

Figure 3:
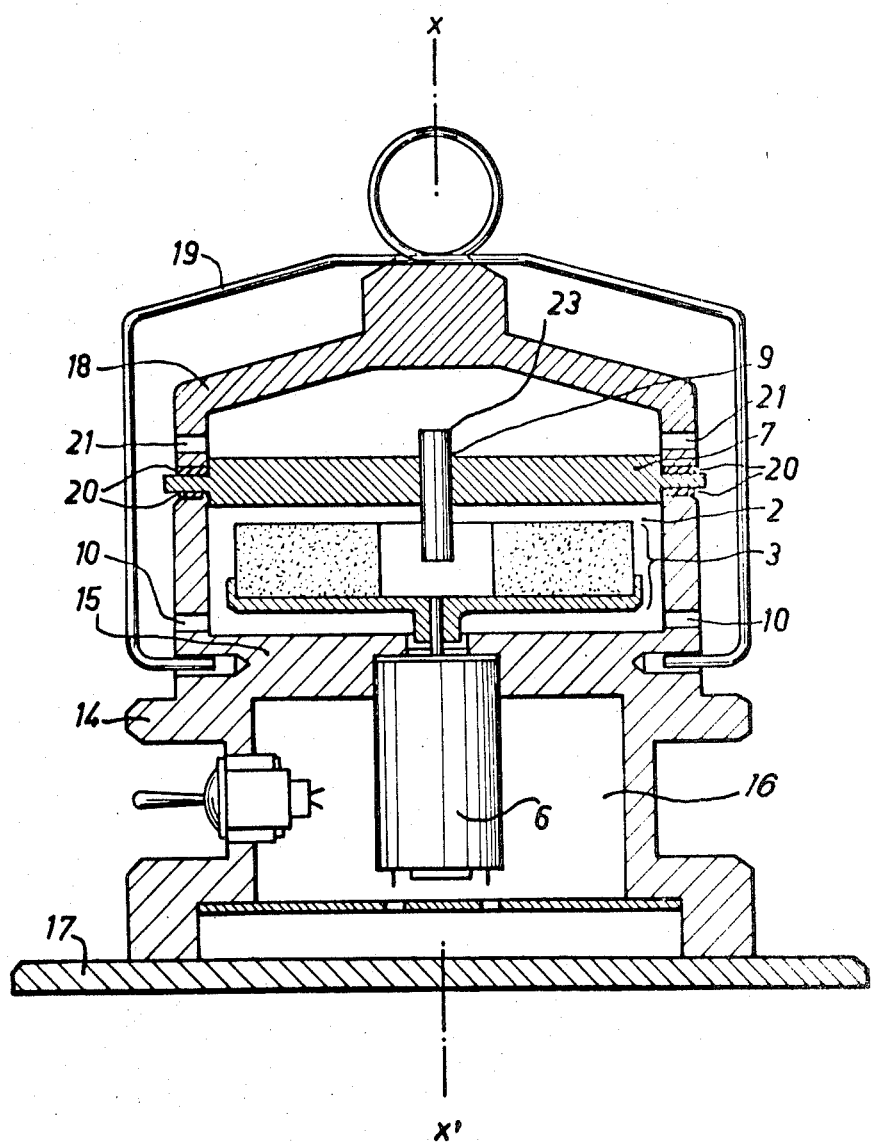
FIG. 3 is a view in longitudinal section of a form of construction of the apparatus according to the invention.
Figure 6:
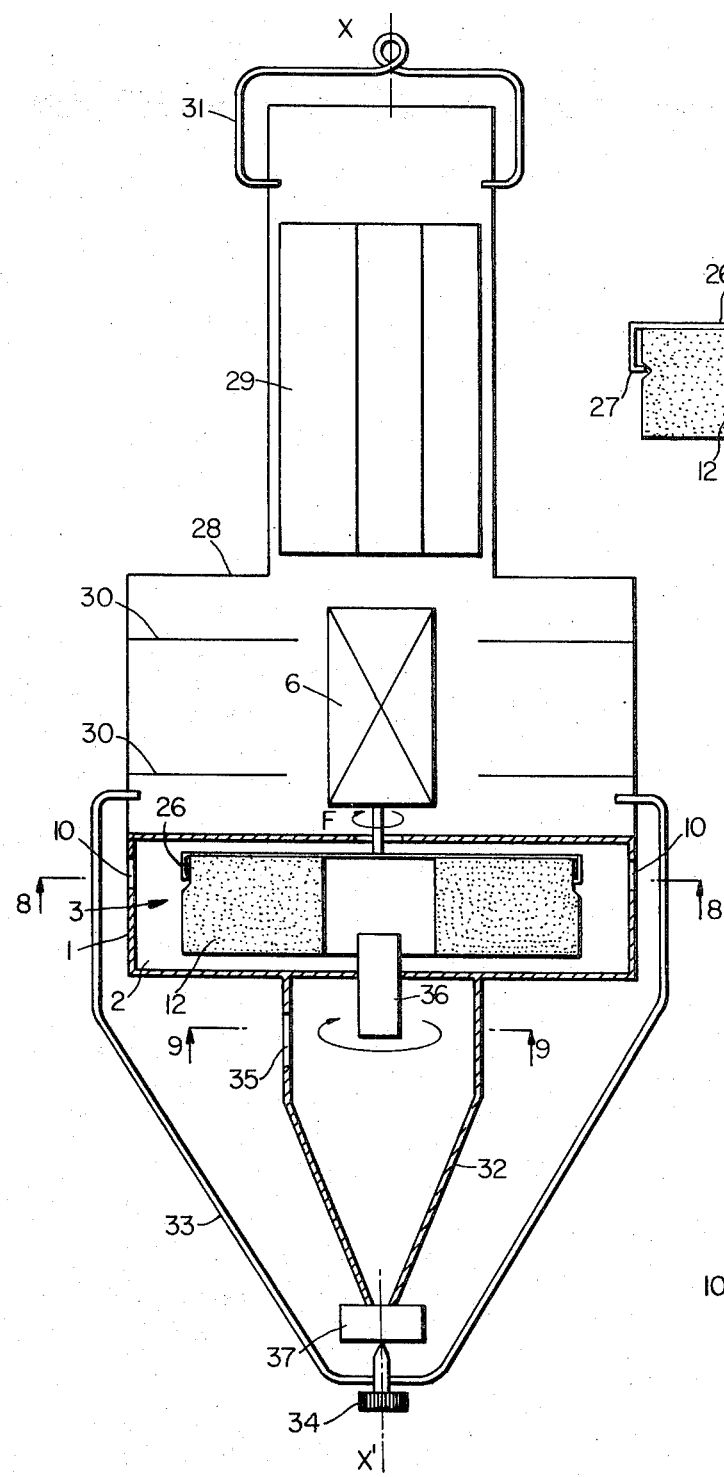
FIG. 6 is a diagrammatic section in elevation of the improved apparatus providing a selective sampling for dust in suspension in a polluted atmosphere.
Figure 7:
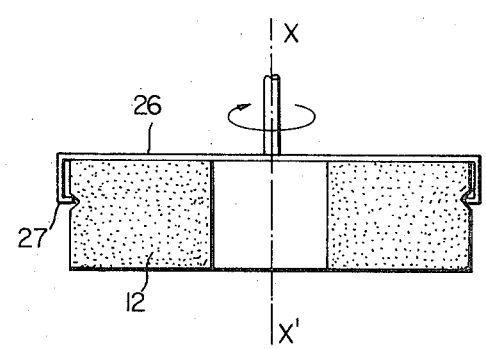
FIG. 7 is a view in cross-section-elevation of an alternative form of construction of the rotating system.

FIG. 3 shows a view in longitudinal cross-section of a form of construction of the apparatus according to the invention, consisting of A lower half-casing 14 forming a base, divided by an intermediate partition 15 into a lower compartment 16 open towards the bottom and closed by a base-plate 17, and in which are installed the motor 6 and its accessories, and an upper chamber 2, open towards the top, in which is mounted the rotor 3, and constituting the sampling chamber;

A removable partition 7 placed on the said upper chamber 2 and pierced with an axial hole 9 forming the suction orifice of the sampling chamber; and An upper half-casing 18 forming a cover, placed on the removable partition 7 and coupled to the lower half-casing 14 by any known means, such as the spring clip or stirrup 19, for example, air-tightness between the three elements being effected by means of the annular gaskets or joints 20. The lateral wall of the cover 18 and the lateral wall of the sampling chamber are pierced with small peripheral holes 10 and 21, uniformly distributed over the periphery of each of the said lateral walls. These holes may be radial and at right angles to the axis X'-X, as shown in FIG. 3; they may also be arranged tangentially to the corresponding wall or inclined with respect to the axis X'-X.

This distribution of the peripheral holes, both for the suction and for the evacuation, renders the apparatus according to the invention practically unaffected by variations of the amplitude and the direction of the movements of the outside atmosphere in which the apparatus is placed, which insures the stability of the suction flow of the apparatus during its utilization.

Figure 4:
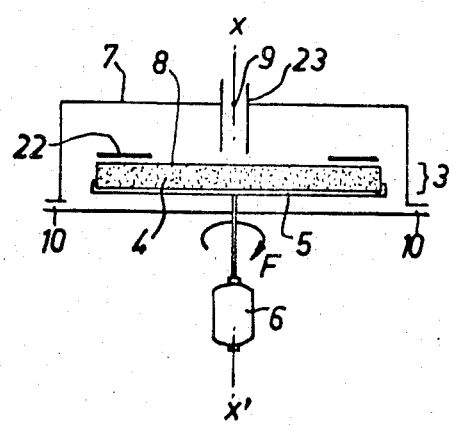
FIG. 4 is a diagrammatic view of an alternative form of the apparatus shown in FIG. 1.
Figure 5:
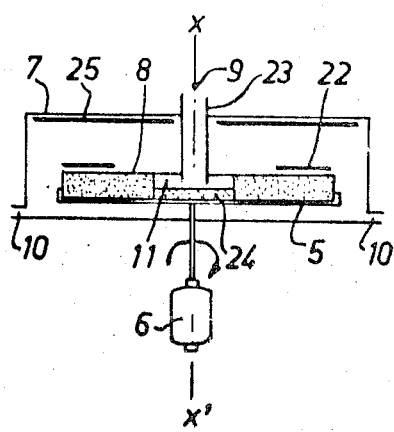
FIG. 5 is a diagrammatic view of an alternative form of the apparatus shown in FIG. 2.

In order to concentrate the suction in the central zone of the filtering element, it may be advantageous to cover at least part of the free face 8 of the filtering element with a washer 22 which is impermeable to air, as shown in FIGS. 4 and 5. In order to improve the channelling of the streams of indrawn air Fa towards the central zone of the filtering element, it may be advantageous to provide the orifice 9 with an axial conduit 23 which either opens in the vicinity of the free face 8 of the filtering element (see FIG. 4), or penetrates into the recess 11 formed in the filtering element (see FIG. 5). In addition, it may be advantageous, also as shown in FIG. 5, to arrange in the recess 11 a disc 24 made of a material more permeable than that of the filtering element 4, in order to collect the large particles which have a tendency to accumulate in the recess without passing into the filtering element.

It is clear that the sections to be given to the suction and evacuation orifices and therefore the rate of re-circulation of the indrawn air in the apparatus will depend on the one hand on the characteristics of the particles to be collected (granular size, concentration, etc.) and on the other hand, on the characteristics of the rotating system which enables the particles to be retained (nature, permeability and filtering power of the material forming the filter, volume and speed of rotation of the rotor 3).

Thus, in the case of apparatus for sampling dust for measurement purposes, which are required to operate for long periods without interruption, there is an advantage in giving fairly low values to the suction and evacuation orifices in order to limit the suction flow to a value much lower than that of the actual output of the rotor (for example 10 percent) and inducing a high rate of re-circulation which, as has been stated above, reduces the effect of the blocking-up of the rotor on the instantaneous suction flow.

On the other hand, in the case where the effect of the blocking-up of the rotor on the suction flow is without importance, it is possible to increase the suction flow of the apparatus by increasing the sections of the suction and evacuation orifices.

In addition, the rotor may be impregnated with a purifying substance (activated carbon for example) which enables certain noxious or bad smelling gases or vapors to be eliminated from the volume of air which has passed through the apparatus, whether this air is or is not charged with particles in suspension.

Furthermore, in order to detect the presence in the the atmosphere examined, of particular gases, it is possible, as shown in FIG. 5, to fix underneath the wall 7 a disc 25, of paper for example, impregnated with colored reagents, which react with particular gas to, for example, change color to indicate presence of such gas.

In FIGS. 6 to 9 of the accompanying drawings, the reference 1 indicates the cylindrical casing having an axis X'-X defining the closed sampling chamber 2 containing the rotor 3, constituted by a cylindrical cup 26 having its opening directed downwards, and by a thick ring 12 of air-permeable material such as polyurethane foam.

Figure 9:
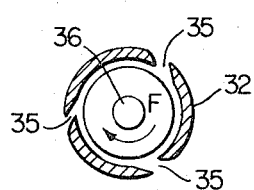
FIG. 9 is a transverse section to a smaller scale of an advantageous alternative form of the cyclone, taken at the level of the axes of the inlet orifices along the line 9—9 of FIG. 6.
Figure 8:
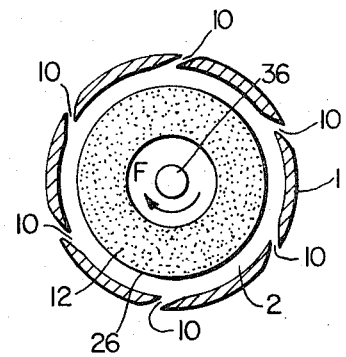
FIG. 8 is a cross-section to a smaller scale, made at the level of the axes of the evacuation orifices, along the line 8—8 of FIG. 6.

The casing 1 is provided with peripheral evacuation orifices 10 directed tangentially to the cylindrical wall of the casing 1 and in the direction of rotation F of the rotor (see FIG. 9). The total section of the outlet orifices, the section of the transfer tube and the transverse section of the sampling chamber are chosen in such manner that the suction flow of the apparatus is very much less than the delivery flow of the fan constituted by the air-permeable rotating ring.

In view of the fact that the opening of the cup 26 is directed downwards, it is necessary that the cup 26 should be designed in such manner that the ring 12 cannot fall. Thus, according to one form of construction, the diameter of the cylindrical edge of the cup 26 is less than the normal diameter of the ring 12 and provides a squeezing of the ring. According to another form of construction shown in FIG. 7, the cup is provided with an internal annular edge 27 which presses into the periphery of the ring.

The rotor 3 is driven in rotation in the direction indicated by the arrow F by the electric motor 6. During the course of its rotation, the ring 12 expands radially due to the action of centrifugal force, which increases the gripping action on the disc by the cylindrical edge of the cup or by the annular edge 27.

The motor 6 is enclosed in an upper casing 28 which further contains the dry cells or batteries 29 employed for supplying the motor, the electrical or electronic circuits necessary for the operation of the apparatus such as for example the regulation circuits 30 for the speed of the motor 6, mounted on printed circuits, or the recharging circuits for the batteries 29.

The upper extremity of the casing 28 is provided with a handle 31 enabling the apparatus to be carried and hooked in a vertical position, keeping the opening of the cup 26 directed downwards.

A removable cyclone-separator 32 is fixed in an airtight manner underneath the lower wall of the casing 1 by means of a clip or stirrup 33 and a clamping screw 34. The cyclone is arranged in such manner that:

Its tangential air-outlets are directed in the direction of rotation F of the rotating system 3 (see FIG. 8); and Its transfer tube 36 is coaxial with the cup 26 and passes into the interior of the thick ring 12.

During the operation of the apparatus, the cyclone 32 retains in its recovery receptacle 37 the largest particles, the finer particles being introduced into the interior of the rotating ring 12 by means of the transfer tube 36. In addition, the fact of eliminating, by means of the cyclone 32, the largest particles from the flow of gas effectively introduced into the sampling chamber reduces the rate at which the filter becomes blocked-up, increases the duration of effective operation of the apparatus and thus permits the collection of a greater mass of interesting particles.

As shown in FIG. 9, the cyclone is advantageously provided with a number of uniformly-distributed tangential inlet orifices 35 arranged so as to give the apparatus a certain independence with respect to the orientation of the gaseous currents existing in the atmosphere in which the apparatus is installed.

The improved apparatus has been shown by way of example, provided with a thick rotor in the form of a ring, but it may alternatively have a rotor in the form of a full disc. Under these conditions, it is obvious that the transfer tube 36 must discharge in the vicinity of the lower surface of the disc.

It will be obvious to those skilled in the art that various changes may be made without departing from the scope of the invention and the invention is not to be considered limited to what is shown in the drawings and described in the specification.

What is claimed is:

1. A device for removing at least a sample of particles in suspension in polluted atmosphere comprising
    a radial fan rotor including a supporting plate having a cylindrical edge and mounted for rotation, and a thick filter of permeable material mounted to be retained by and rotate with said supporting plate, means for rotation of said radial fan rotor connected to said rotor, and means for recirculation of the atmosphere through said filter including said rotor to move the flow through said filter and a static sampling chamber having walls fully enclosing said radial fan rotor, and means to restrict the flow of the atmosphere into and out of said chamber to a lower rate of flow than the delivery flow from said radial fan rotor in said sampling chamber including a suction orifice through a said chamber wall adjacent the center of said filter located therein and evacuation orifices through a said chamber wall adjacent the periphery of said supporting plate.

2. A device as claimed in claim 1 further characterized by a cylindrical recess hollowed out of the center zone of said radial fan rotor.

3. A device as claimed in claim 2 further characterized by said suction orifice being provided with a conduit which passes into said cylindrical recess.

4. A device as claimed in claim 2 further characterized by an additional filtering disc made of a filtering material of higher permeability than said first mentioned filter and having a thickness less than that of said first-mentioned filter being provided inside said recess.

5. A device as claimed in claim 1 further characterized by the free upper face of said radial fan rotor being covered near the periphery thereof by a washer of impermeable material.

6. A device as claimed in claim 1, in which said suction orifice is provided with a conduit delivering in the vicinity of the free upper face of said rotor.

7. A device in accordance with claim 1, in which said filter is made of a plastic foam with open pores.

8. A device as claimed in claim 1, further comprising a second chamber and wherein said suction orifice provides communication between said closed sampling chamber and said second chamber, said second chamber being provided with a plurality of peripheral suction orifices.

9. A device as claimed in claim 8, in which the axes of said peripheral suction orifices and the axes of said evacuation orifices are directed tangentially with respect to a lateral wall of said sampling chamber.

10. A device as claimed in claim 1, in which at least the wall of said sampling chamber pierced with said suction orifice is made of transparent material.

11. A device as claimed in claim 10 in which an element impregnated with colored reagents is fixed on the internal face of the wall of said sampling chamber which is pierced with said suction orifice.

12. A device as claimed in claim 1, in which said filter is impregnated with a purifying substance permitting the elimination of certain noxious or bad smelling gases or vapors.

13. A device as claimed in claim 1, further characterized by said supporting plate with said cylindrical edge opening in a downward direction, said peripheral evacuation orifices arranged tangentially with respect to a said chamber wall in the direction of rotation of said rotor, a cyclone-separator comprising at least one tangential inlet and fixed in an air-tight and removable manner underneath a lower wall of said sampling chamber, and a transfer tube directed upward from said cyclone-separator through said suction orifice of said sampling chamber.

14. A device as claimed in claim 13, characterized by the fact that the cylindrical edge of said plate is provided with an inturned annular portion engaging with pressure on the periphery of said thick filter.

15. A device as claimed in claim 13 characterized by the fact that the diameter of the cylindrical edge of said plate is slightly smaller than the normal diameter of the thick filter.

* * * * *